Figure 1:
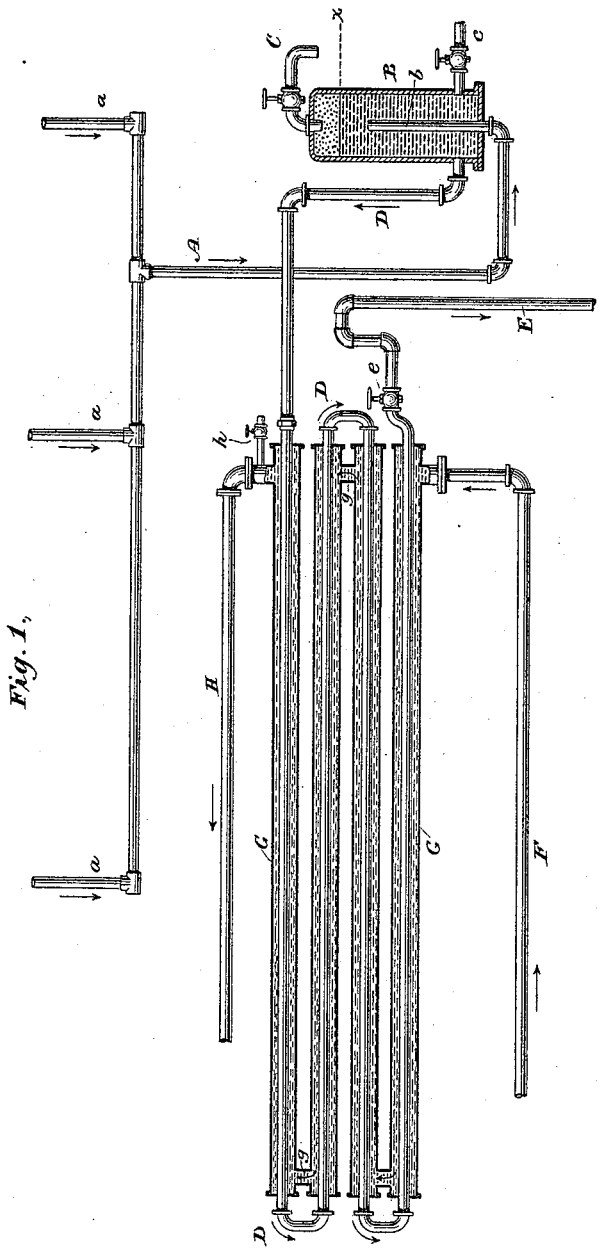

(No Model.) 2 Sheets—Sheet 2.
E. NELSON.
METHOD OF TREATING HEATED LIQUID WASTES AND APPARATUS THEREFOR.
No. 440,410. Patented Nov. 11, 1890.
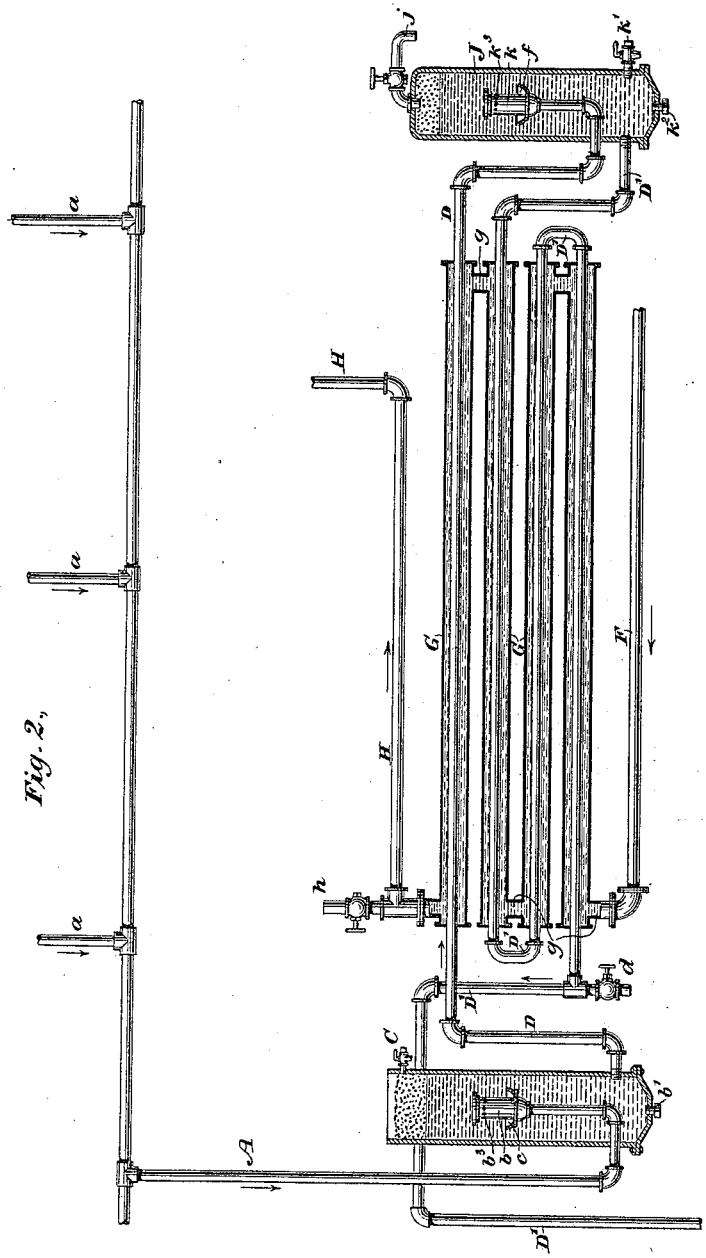

(No Model.) 2 Sheets—Sheet 1.

E. NELSON.
METHOD OF TREATING HEATED LIQUID WASTES AND APPARATUS THEREFOR.

No. 440,410. Patented Nov. 11, 1890.

Witnesses
Geo. W. Breck
Sam'l F. Macpeak

Inventor
Elihu Nelson
By his Attorney
Franklin L. Pohl

UNITED STATES PATENT OFFICE.

ELIHU NELSON, OF NEW YORK, N. Y.

METHOD OF TREATING HEATED LIQUID WASTES AND APPARATUS THEREFOR.

SPECIFICATION forming part of Letters Patent No. 440,410, dated November 11, 1890.

Application filed August 30, 1890. Serial No. 363,567. (No model.)

*To all whom it may concern:*

Be it known that I, ELIHU NELSON, a citizen of the United States, residing in the city, county, and State of New York, have invented a certain new and useful Improvement in Methods of Treating Heated Liquid Wastes and Apparatus Therefor, of which the following is a specification.

In manufacturing and other establishments in which steam machinery is employed the hot waste water and partially-condensed steam which is derived from the leakage of steam-pipes, valves, cylinder-cocks, and the like, more or less mingled with oily lubricating material, which wastes collectively are termed "drips," have usually been collected by means of suitable branch pipes and conveyed into a main "drip-pipe," by which these and other similar waste liquids are discharged into a sewer or other convenient place for their disposal.

Under some conditions—and this is more especially the case in large cities—the presence of heated liquid wastes in the sewers is very objectionable, particularly when these are charged, as they usually are, with a considerable proportion of oily or greasy matter.

The object of my invention is to provide a convenient automatically-acting apparatus, whereby the oleaginous components of the waste liquids may be continuously and effectually separated and the contained heat may also be extracted therefrom and utilized—as, for example, by transferring it to the feed-water which supplies the boilers from which the heat was originally derived.

In the accompanying drawings, Figure 1 is a diagrammatic representation of a simple form of apparatus embodying the main principles of my invention, while Fig. 2 is a similar but somewhat more elaborate organization, which may preferably be employed in case the volume of liquid to be treated is considerable or the proportion of oily matter is unusually great.

Referring to Fig. 1, *a a a* are branch waste-pipes leading from engines, boilers, steam-heating apparatus, and the like, which are supposed to be situated in different parts of a large building or group of buildings. These branches are united together to form a main drip-pipe A, which descending is turned up to enter the bottom of a closed metallic vessel B, within which it rises vertically and terminates at a height equal to, say, two-thirds (more or less) of the distance from the bottom to the top of the vessel. The vessel B, which may be termed an "extractor," is fitted with a second pipe D, leading out from it near its bottom, which may be termed an "eduction-pipe," and which for any required portion of its length is inclosed within an outer pipe G, the two thus forming a two-chambered pipe, one of its chambers being within the pipe D and the other between the pipe D and the pipe G, and separated from each other by the heat-conducting partition formed by the walls of the first-named pipe. This two-chambered pipe may be of any required length, as hereinafter shown. For the sake of convenience and economy of space, it may with advantage be made in several parallel short lengths, both the inner and outer sets of pipe being respectively connected together alternately at each end, as shown in the drawings. After passing through the length of the larger pipe G the smaller pipe D enters, through a valve, the pipe E, which is continuous with it, and the office of which is to discharge the waste liquids into the sewer, or to convey them to some point where they may be otherwise disposed of. The pipe E is so curved that a trap is formed behind its upward bend, by which the level of the hot liquid in the extractor B is maintained at or near the level shown by the dotted line *x*.

The cold-water-supply pipe from which the boiler is fed enters at F, the cold water flowing in the direction indicated by the arrow. It passes into the pipe G at the same end of the double-chambered portion at which the pipe D passes out, and thence flows through the whole length of each successive section of the pipe G, passing out finally into the pipe H which leads to the boiler.

It will be understood from the description which has been given that the heated liquid waste collected in the drip-pipe A, being held back by the trap, will accumulate in the extractor B until it reaches the level of the dotted line *x*. While the liquid remains standing in this receptacle its greasy and oily constituents, being of less specific gravity than the water, will separate themselves therefrom and rise to the upper portion of the vessel, from which they may be withdrawn from time to time by means of the oil-cock C. By this means the clogging of the pipes of the cooling-chamber due to the deposition of oily matter, which would otherwise cause great inconvenience, is avoided.

It is important that the connections of the double-chambered pipe should be made substantially as shown in the drawings, so that a continuous flow of cold water will take place in one of these chambers, preferably the outer one, in one direction, while a continuous flow of hot water shall enter the inner chamber and flow in the opposite direction. The result of this process is that a continuous transfer of heat takes place through the heat-conducting partition from the waste water to the cold water, which passes through the feed-pipe to the boiler, or may be utilized in any other convenient manner, so that by the time the waste water reaches its outlet at $e$ it has been reduced to the same temperature as the cold water, which enters the system near the same point, and may then be discharged into the sewer without objection.

When the quantity of waste liquid to be treated is very great or its temperature is high or it is heavily charged with oily constituents, the apparatus shown in Fig. 2 may be employed with advantage. In this organization the drip-pipe A enters the receptacle B near the bottom, and its upwardly-extending end is preferably provided with an enlargement $b$ closed at the upper end, but provided with horizontal perforations $b^3$, through which the hot liquid reaches the interior of the receptacle B. This permits the steam, which is sometimes mixed with the hot water, to expand and become condensed, and thence to escape into the receptacle B without agitating the surface of the liquid contained therein. The enlarged end of the pipe $b$ is preferably provided with an annular cup $c$, which serves to catch any oil which may tend to creep down the exterior of the pipe and to collect the same in aggregations, which soon detach themselves and float to the surface.

The outlet of the receptacle B through the pipe D passes through a portion of the cooling-chamber, (one length, as shown in Fig. 2, being usually sufficient,) from whence it enters at $k$ into the interior of a second extractor J through perforations $k^3$. This receptacle is preferably closed at the top, and is fitted with an oil-cock $j$, a blow-off cock $k'$, by which it may be emptied of its contents, and a plug $k^2$, closing an opening, through which sediment may be removed from the bottom of the vessel.

In passing through the section of pipe D the hot liquid is partially cooled, and is therefore in condition to more readily part with the small portion of its oily components which may remain after passing the extractor B. These oleaginous constituents having been thoroughly separated the waste water enters the pipe D′, passing through the remaining portion of the cooling-chamber and thence to the place where the wastes are disposed of at the left of the drawings, as indicated by the arrows.

The hot-water pipe may with advantage be provided with a blow-off cock at $d$ and the cold-water pipe with a similar cock at $h$, for the purpose of emptying them of their contents when necessary.

I claim as my invention—

1. The method, substantially as hereinbefore set forth, of treating hot waste liquids, which consists in extracting the oleaginous constituents therefrom by the action of gravity in a suitable receptacle and then cooling the remaining liquid by passing it through an elongated chamber, separated by a heat-conducting partition from a current of cold liquid passing in an opposite direction therethrough.

2. The combination of the drip-pipe, the extractor, the boiler-feed pipe, and the eduction-pipe leading from the extractor, inclosed within and extending longitudinally through the feed-pipe toward the direction from which said feed-pipe received its supply.

3. The combination, with the extractor, of a cooling apparatus consisting of a double-chambered pipe, and connections whereby the heated liquid flowing from the separator is caused to circulate through one chamber of said pipe in one direction while a cold liquid is caused to circulate in an opposite direction through the other chamber.

4. The combination of the drip-pipe, the extractor, the cold-water pipe, and an eduction-pipe leading from the extractor which is inclosed within and extends longitudinally through the cold-water pipe.

5. The combination of a cooling apparatus consisting of a two-chambered pipe provided with connections whereby heated liquid is caused to circulate through one of its chambers in one direction, while cold liquid is caused to circulate through the other chamber in the opposite direction, with a drip-pipe, and an extractor constructed substantially as described, when said extractor is so situated that the hot liquid enters it after having traversed one section of a cooling-chamber and when discharged therefrom traverses another section of said chamber.

6. The combination of a cooling apparatus consisting of a two-chambered pipe provided with connections whereby heated liquid is caused to circulate through one of its chambers in one direction, while cold liquid is caused to circulate through the other chamber in the opposite direction, with two independent extractors constructed substantially as described, when, one of said extractors is so situated that the hot liquid passes through it before traversing the first section of a cooling-chamber, and the other extractor is so situated that said liquid enters it after having traversed said section and after being discharged from the second extractor traverses another section of said chamber.

7. The combination, with the drip-pipe, of the extractor formed of a receptacle surrounding the inwardly-extending upper end of said drip-pipe, the closed end of said pipe, the perforations therein, and the oil-cock at or near the top of said closed vessel.

8. The combination, with the drip-pipe, of an extractor formed of a receptacle surrounding the inwardly-extending upper end of said drip-pipe, the enlargement of said pipe within said vessel having a closed end, and the perforations therein.

9. The combination, with the drip-pipe, of the extractor formed of a receptacle surrounding the inwardly-extending upper end of said drip-pipe, the closed end of said pipe, the perforations therein, and the annular oil-cup surrounding said pipe.

In testimony whereof I have hereunto subscribed my name this 20th day of August, A. D. 1890.

ELIHU NELSON.

Witnesses:
FRANKLIN LEONARD POPE,
CAROLINE E. DAVIDSON.